W. GORDON.
EDGE SETTING MACHINE.
APPLICATION FILED JUNE 16, 1902.
937,434.
Patented Oct. 19, 1909.
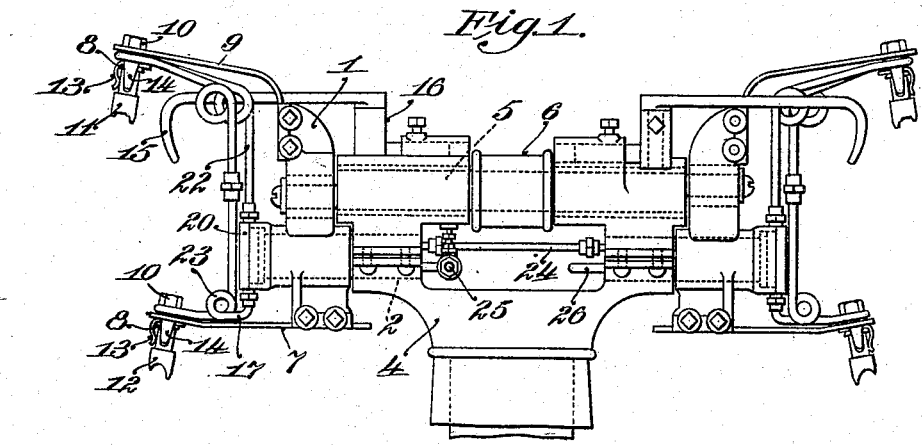
Fig. 1.
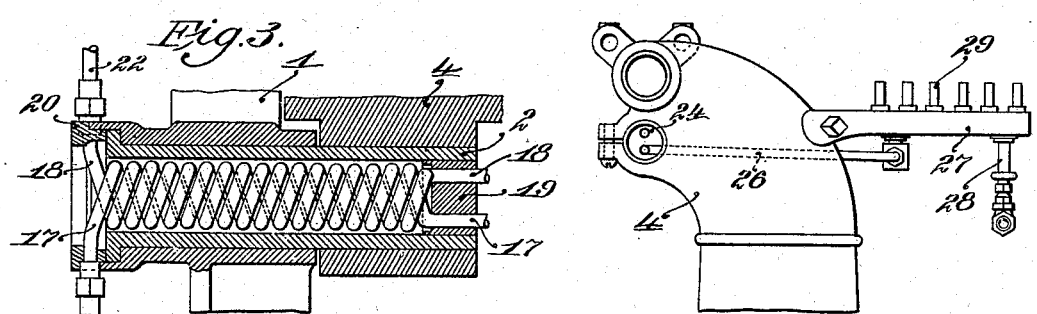
Fig. 3.
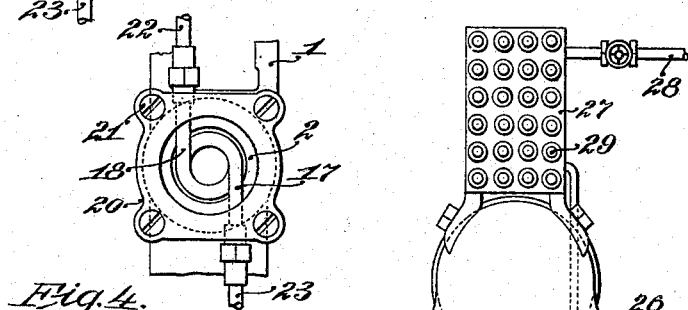
Fig. 4.
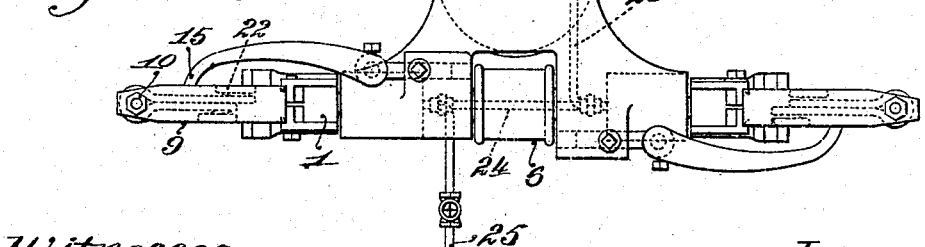
Fig. 5.
Fig. 2.
Witnesses
Edward S. Day
Alice E. White
Inventor
William Gordon
by his Attorneys
Phillips Van Everen & Fish

UNITED STATES PATENT OFFICE.

WILLIAM GORDON, OF BOSTON, MASSACHUSETTS, ASSIGNOR TO UNITED SHOE MACHINERY COMPANY, OF PATERSON, NEW JERSEY, A CORPORATION OF NEW JERSEY.

EDGE-SETTING MACHINE.

937,434. Specification of Letters Patent. Patented Oct. 19, 1909.

Application filed June 16, 1902. Serial No. 111,840.

*To all whom it may concern:*

Be it known that I, WILLIAM GORDON, a citizen of the United States, residing at Boston, in the county of Suffolk and State of Massachusetts, have invented certain new and useful Improvements in Edge-Setting Machines; and I do hereby declare the following to be a full, clear, and exact description of the invention, such as will enable others skilled in the art to which it appertains to make and use the same.

The present invention relates to edge setting machines which are used in the manufacture of boots and shoes to smooth and burnish or " set " the edge of the sole.

My invention has for its object to provide an edge setting machine having improved means for supporting and actuating the edge setting tools whereby the tools are caused to act to better advantage on the curved edge of a sole and the edge setting operation can be more easily, quickly and satisfactorily performed.

My invention also has for its object to provide an edge setting machine having improved means for heating the edge setting tool or tools.

With these objects in view my invention contemplates providing an edge setting machine with a tool for acting upon the forepart of the sole and with a tool for acting upon the shank of the sole and so supporting and actuating the tools that their working faces are caused to move in paths corresponding approximately to the curves of those portions of the edge of the sole to which the tools are to be applied. Thus, in accordance with my invention, the forepart tool is moved in a curved path with its working face on the inside of the curve and the shank part tool is moved in a curved path with its working face on the outside of the curve, this arrangement of the tools causing the working face of the forepart tool to be moved in a path corresponding to the convex curves of the forepart of the sole and the working face of the shank part tool to be moved in a path corresponding to the concave curves of the shank. Among the advantages accruing from this arrangement of the tools are that the tool remains in contact with the curved edge of the sole throughout the whole or the greater part of its movement and does not compress or " take into " the stock more at one point in its stroke than at another whereby rapidity of operation is secured and a smooth even surface is produced without any special care on the part of the operator. These and other advantages will be apparent to those skilled in the art. This feature of my invention broadly considered may be embodied in any construction in which the working face of one tool is on the inside of the curve in which the tool moves, and the working face of the other tool is on the outside of the curve in which the tool moves. In its preferred form this feature of my invention is embodied in a construction in which the forepart tool is oscillated about a center toward which the working face of the tool is directed and the shank part tool is oscillated about a center away from which the working face of the tool is directed.

In the machine illustrated in the drawings accompanying this application and hereinafter specifically described which machine embodies my invention in the best form at present known to me the tools are mounted to oscillate upon opposite sides of a center, such arrangement allowing the operator to act to advantage in pressing the shoe against either tool and to transfer the shoe from one tool to the other without loss of time. The tools are carried by an oscillating head upon opposite sides of its pivot, the forepart tool being above and the shank part tool below the pivot whereby an extremely simple and efficient means for supporting and actuating the tools is provided. Each tool is held on the oscillating head by means of a tool holder carried at the free end of a leaf spring secured to the oscillating head. The tool of an edge setting machine is usually mounted to allow the tool to yield when a shoe is pressed against it by the operator and each leaf spring constitutes a simple and efficient yielding connection between a tool holder and the oscillating head to allow such movement of the tool.

My invention also contemplates providing an edge setting machine with improved means for heating the edge setting tool or tools by steam. The means for heating the tool which is usually employed consists of a gas jet which is directed against the tool. The advantages of using steam to heat the tool are that thereby the tool is maintained at a more uniform temperature, all danger of overheating the tool and causing it to scorch the edge of the sole as often occurs when the tool is heated by means of a gas jet is avoided and a saving in the cost of heating the tool is effected. Furthermore, the provision in an edge setting machine of means for heating the tool by steam enables the operator to breath purer air and to work in a cooler place than when a gas jet for heating the tool is provided as the steam heating apparatus does not vitiate the air which the operator is compelled to breathe while bending over the tool in using the machine, nor is it affected by drafts of air which would extinguish a gas jet.

Edge setting machines provided with means for heating the edge setting tool or tools by steam have heretofore been devised but these machines have been objectionable for various reasons and few, if any of them, are in use at the present time. In certain of these machines other parts such as the head as well as the tool were heated which resulted in the rapid drying up of the lubricating oil in the bearings as well as in the radiation of a sufficient amount of heat to seriously interfere with the comfort of the operator. All edge setting machines provided with means for heating the tool by steam which have heretofore been devised, so far as I am aware of the state of the art, have been defective in that the joints and connections of the steam heating apparatus do not remain tight for any length of time but soon become worn and broken on account of the rapid vibration of the tool carrying head and allow the steam to escape. The tool of an edge setting machine is vibrated at the rate of twenty-five hundred complete vibrations a minute and upward and when swivel or other movable joints are used to connect the stationary and moving parts of the heating apparatus these joints become worn and useless in a comparatively short time. Flexible connections such as rubber or canvas hose are soon torn from their couplings or are disintegrated by the oil with which they unavoidably become coated. Furthermore such connections and their couplings are necessarily objectionably bulky in order to withstand the pressure to which they are liable to be subjected.

My improved means for heating the tool or tools of an edge setting machine is free from the objections above noted and by its provision an edge setting machine is produced provided with a simple compact and durable means for heating the tool by steam, which result so far as I am advised as to the state of the art has never before been accomplished.

My improved means for heating the edge setting tool or tools comprises a steam pipe coiled around the axis of the tool carrying head and a steam pipe movable with the head connected to one end of the coiled pipe whereby the coiled pipe forms a connection between the moving and stationary parts of the steam heating apparatus. Since the coiled pipe surrounds the axis of the vibrating head the only strain put upon the pipe is one tending to cause it to be coiled tighter or uncoiled, which strain is distributed throughout the length of the coil, and consequently the pipe remains intact for a long time notwithstanding the rapid vibration of the head.

For reasons which will be obvious to those skilled in the art I preferably provide both a feed and a return steam pipe coiled around the axis of the tool carrying head and a feed and a return steam pipe movable with the head connected to one end of the coiled pipes. In this connection I desire to state that the terms "feed" and "return" refer only to the functions of the pipes and that the feed and return pipes which are movable with the head may be separate pipes or a single pipe and may be connected to the coiled pipes by suitable couplings or by being formed integral therewith. As affording a compact and simple construction and at the same time rendering the use of a long coil possible I also prefer to form the pivot of the vibrating head hollow and to arrange the coiled pipes so that they pass through the hollow pivot.

In order to guard against any movement of the pipes which connect the stationary and moving parts of the steam heating apparatus except in the coiled portions I preferably provide means for holding the coils from movement at one end.

In the embodiment of my invention hereinafter described each edge setting tool is heated by a steam pipe which passes around the tool holder. This arrangement is extremely simple and efficient and I consider it of value and as a feature of my invention apart from the particular form of connections between the pipe and the stationary part of the apparatus.

It is desirable in an edge setting machine in which the tools are heated by steam that means be provided for heating the tools before they are placed in the tool holder so that no time may be lost in waiting for the tool to become heated when a change is made in the tools for different kinds of work. I have accordingly provided the machine hereinafter described with a steam heated holder for the tools which are not in use.

In addition to the features of invention above referred to my invention also consists in the devices, combinations and arrangements of parts hereinafter described and claimed the advantages of which will be obvious to those skilled in the art.

A preferred form of my invention is illustrated in the accompanying drawing in which—

Figure 1 is a view in side elevation of an edge setting machine embodying the same, Fig. 2 is a plan view of the machine, Fig. 3 is a detail sectional view on a plane passing vertically through the axis of the vibrating head, the coiled pipes being shown in side elevation, Fig. 4 is an end view of the parts illustrated in Fig. 3 and Fig. 5 is an end view of the frame of the machine and a portion of the heating apparatus.

The machine shown in the drawings is a double machine, that is, a vibrating tool carrying head is mounted on each end of the frame as is usual in this class of machines. The mechanisms and apparatus at each end of the machine are duplicates of each other and a description of one will suffice for both. The tool carrying head is indicated at 1 and is pivotally mounted upon a hollow stud or sleeve 2 secured in a split socket in the frame of the machine which is indicated at 4. A driving shaft 5 provided with a belt pulley 6 between its bearings is journaled in the frame 4 above the sleeve 2 and is provided with a crank pin at its end which has a bearing in a rectangular block mounted in a slot in the head 1, the arrangement being such that a vibrating movement is imparted to the head as the shaft is rotated. Secured to the head 1 below its pivot and projecting therefrom is a leaf spring 7 to the free end of which is secured a tool holder 8 and secured to head 1 above its pivot is a leaf spring 9 to the free end of which is secured a similar tool holder. These tool holders are secured to the springs by means of nuts 10 which have a screw threaded engagement with portions of the holders passing through holes in the springs and clamp the springs against shoulders on the holders.

11 and 12 indicate the fore-part and shank-part tools respectively. These tools are of well known construction being provided with tubular sockets which receive the pins of the tool holders and being held in position by locking springs 13. The fore-part tool is carried by the head above the center about which it oscillates and its working face is directed toward this center while the shank-part tool is carried by the head below and its working face is directed away from this center so that the working faces of the tools move in paths corresponding approximately to the convex and concave curves of the portions of the sole upon which they operate the advantages of which mode of operation have been hereinbefore explained.

As I have stated the tools are of well known construction. Heretofore the socket of such a tool or the spindle of its holder or both have rapidly become worn so that the tool vibrates in its holder thereby rendering the machine exceedingly noisy and the work of the operator more difficult. To prevent this vibration of the tool I have provided an improved means for holding the tool, which as shown in the drawing consists of springs 14 arranged to bear against the sides of the tool socket. These springs yieldingly engage the sides of the tool socket and prevent it from vibrating in its holder.

A hand rest 15 of suitable construction is arranged in proximity to the fore-part tool in position to be grasped by the operator while pressing the sole of a shoe against the tool. As shown the hand rest is formed integral with a horizontal arm, the rear end of which is provided with a pin which is secured in a socket 16, the pin of which is secured in a socket in the machine frame.

The apparatus for heating the tools by steam comprises two coiled pipes 17 and 18, one of which is a feed pipe and the other a return pipe. The pipes are located in the sleeve 2 so that they are coiled around the pivotal axis of the head 1. At their inner ends the pipes enter holes in a block 19 rigidly secured in the inner end of the sleeve whereby the pipes are held from movement at this end of the sleeve. At the outer end of the sleeve the pipes extend tangentially in opposite directions the pipe 17 extending vertically downward and pipe 18 extending vertically upward. The pipes pass through openings formed partially in an outwardly extending portion of the head and partially in a clamping plate 20 secured to the head by screws 21. The pipes are thus securely clamped to the head close to their coiled positions so that any bending of the pipes outside of their coiled portions during the vibrations of the head is avoided. The pipe 18 is connected by a coupling to a pipe 22 which passes around the tool holder of the fore-part tool 11, and the pipe 17 is connected to a pipe 23 which passes around the tool holder of the shank part tool 12. The pipes 22 and 23 are connected by a coupling so that the steam passes from one of the pipes 17 and 18 to the other through pipes 22 and 23 and heats the tool holders and the tools held therein. Coils are formed in the pipes 22 and 23 as shown to allow for the vertical movements of the tools during the operation of setting the edge of a shoe sole.

The pipes 18 on each end of the machine communicate with each other through a pipe 24 and the pipes 17 communicate one with a pipe 25 and the other with a pipe 26. The pipe 26 communicates with a steam chest 27 secured to the frame of the machine and the steam chest communicates with a pipe 28. One of the pipes 25 and 28 is a feed pipe and is connected with a source of steam supply, and the other is the return pipe. The top of the steam chest 27 is provided with a series of spindles 29 upon which the tools not in use are placed and by which they are heated so as to be in condition for immediate use.

Having thus indicated the nature and scope of my invention and having specifically described a machine embodying the preferred form thereof, I claim as new and desire to secure by Letters Patent of the United States.

1. An edge setting machine, having, in combination, a pivotally mounted tool carrying head, means for oscillating the head, and edge setting tools carried by the head upon opposite sides of its pivot, a tool upon one side of the pivot having its working face directed toward the pivot and a tool upon the opposite side having its working face directed away from the pivot substantially as described.

2. An edge setting machine, having, in combination, a pivotally mounted tool carrying head, means for oscillating the head, a fore-part edge setting tool carried by the head above its pivot, and having its working face directed toward the pivot and a shank edge setting tool carried by the head below its pivot, and having its working face directed away from the pivot substantially as described.

3. An edge setting machine, having, in combination, a pivotally mounted tool carrying head, means for oscillating the head, a leaf spring secured to the head and projecting therefrom, and a tool holder carried by the free end of the spring, substantially as described.

4. An edge setting machine, having, in combination, a pivotally mounted tool carrying head, means for oscillating the head, two leaf springs secured to the head and projecting therefrom above and below its pivot respectively, and tool holders carried by the free ends of the springs, substantially as described.

5. An edge setting machine, having, in combination, two edge setting tools mounted to oscillate on opposite sides of a center and having their working faces directed, one toward and the other away from, said center and means for oscillating the tools, substantially as described.

6. An edge setting machine, having, in combination, an oscillating edge setting tool, having its working face directed toward the center about which the tool oscillates, an oscillating edge setting tool having its working face directed away from the center about which the tool oscillates, and means for oscillating the tools, substantially as described.

7. An edge setting machine, having, in combination, a pivotally mounted tool carrying head, means for vibrating the head, a tool holder carried by the head, an edge setting tool removably mounted on the tool holder, and a steam pipe mounted on the head so as to move therewith and surrounding the tool holder so as to heat the tool holder and tool, substantially as described.

8. An edge setting machine, having, in combination, an oscillating tool carrying head, a hollow pivot therefor, an edge setting tool carried thereby, a steam pipe coiled around the pivotal axis of the head passing through the hollow pivot and immovably held at one end, and a steam pipe movable with the head connected to the free end of the coiled pipe, substantially as described.

9. An edge setting machine, having, in combination, an oscillating tool carrying head, a hollow pivot therefor, an edge setting tool carried thereby, feed and return steam pipes coiled around the pivotal axis of the head passing through the hollow pivot and immovably held at one end, and feed and return steam pipes movable with the head connected to the free ends of the coiled pipes, substantially as described.

10. An edge setting machine, having, in combination, a pivotally mounted tool carrying head, an edge setting tool carried thereby, a steam pipe coiled around the pivotal axis of the head and a steam pipe movable with the head connected to the coiled pipe, substantially as described.

11. An edge setting machine, having, in combination, an oscillating tool carrying head, a hollow pivot therefor, a tool holder carried thereby, feed and return steam pipes coiled around the pivotal axis of the head passing through the hollow pivot and immovably held at one end, and feed and return steam pipes movable with the head connected to the free ends of the coiled pipes, and passing around the tool holder, substantially as described.

12. An edge setting machine, having, in combination, an oscillating tool carrying head, a hollow pivot therefor, an edge setting tool carried thereby, a steam pipe coiled around the pivotal axis of the head passing through the hollow pivot, and a steam pipe movable with the head connected to one end of the coiled pipe, substantially as described.

13. In an edge setting machine, a tool holder, having in combination, a spindle to enter the socket of the tool, and springs acting in the plane in which the tool vibrates arranged to bear against the sides of the socket and prevent vibration of the tool in the holder, substantially as described.

14. An edge setting machine, having, in combination, a plurality of edge setting tools, means for moving one of said tools in a curved path with its working face directed toward the inside of the curve and means for moving another tool in a curved path with its working face directed toward the outside of the curve, substantially as described.

In testimony whereof I affix my signature, in presence of two witnesses.

WILLIAM GORDON.

Witnesses:
 FRED O. FISH,
 HORACE VAN EVEREN.